United States Patent [19]

Flint et al.

[11] Patent Number: 5,323,266
[45] Date of Patent: Jun. 21, 1994

[54] ELECTROFORMED BURIED GRATINGS FOR HIGH-POWER SHARED APERTURE SYSTEMS

[75] Inventors: Graham W. Flint, Albuquerque, N. Mex.; Stephen R. Tuenge, Sanford, Fla.

[73] Assignee: United States of America as represented by the Secretary of the Air Force, Washington, D.C.

[21] Appl. No.: 23,506

[22] Filed: Feb. 26, 1993

[51] Int. Cl.$^5$ .............. G02B 5/18; G02B 5/28; G02B 27/44
[52] U.S. Cl. ................... 359/566; 359/569; 359/576; 359/585; 359/590; 427/162
[58] Field of Search ............... 359/359, 360, 566, 569, 359/576, 583, 584, 585, 590; 427/162, 164, 165, 166

[56] References Cited

U.S. PATENT DOCUMENTS

| | | | |
|---|---|---|---|
| 818,966 | 4/1906 | Ives | 359/566 |
| 2,464,738 | 3/1949 | White et al. | 359/566 |
| 4,476,161 | 10/1984 | Pohle et al. | 427/162 |
| 4,484,797 | 11/1984 | Knop et al. | 359/569 |
| 4,662,653 | 5/1987 | Greenaway | 359/566 |
| 4,772,080 | 9/1988 | Tustison | 350/1.6 |
| 4,787,690 | 11/1988 | Maerz | 359/569 |
| 5,023,198 | 6/1991 | Strege | 437/129 |
| 5,033,816 | 7/1991 | Blondeau et al. | 359/566 |
| 5,238,785 | 8/1993 | Ohkura et al. | 359/566 |

*Primary Examiner*—Martin Lerner
*Attorney, Agent, or Firm*—Robert L. Nathans

[57] ABSTRACT

A two-metal grating is produced by vacuum depositing a first dielectric coating upon a separation layer formed upon a mandrel; then depositing a first optically opaque metallic layer, etching the layer to form stripes; then vacuum depositing a second optically opaque film; then electroforming a backing structure and separating the dielectric coating from the separation layer on the mandrel to form a free-standing grating structure having a smooth surface. This structure can then be affixed to a metallic mirror. A buried phase grating can also be fabricated by additionally depositing a second dielectric layer and a third metallic layer.

20 Claims, 1 Drawing Sheet

ELECTROFORMED BURIED GRATINGS FOR HIGH-POWER SHARED APERTURE SYSTEMS

STATEMENT OF GOVERNMENT INTEREST

The invention described herein may be manufactured and used by or for the Government for governmental purposes without the payment of any royalty thereon.

BACKGROUND OF THE INVENTION

Many space and ground/space optical systems are based upon the simultaneous use of more than one wavelength or wavelength band. For example, in ballistic missile tracking, the handover from boost phase tracking must use a mid-IR band (usually at 2.7-2.9 microns) in conjunction with the 8-12 micron band associated with cold body tracking. A high-energy laser weapon system usually is required to operate on two target tracking bands while transmitting at the laser wavelength. Many ground based laser system concepts call for the simultaneous tracking of a monochromatic beacon while transmitting at some other wavelength. For purely space based applications, the use of a single aperture for multiple functions is desirable from considerations of size, weight and boresight accuracy. In ground/space applications, aperture sharing is dictated by the added requirement that the beacon signal used to control adaptive optics must traverse the same volume of atmosphere as does the aberration corrected beam that is transmitted; i.e., the tracking signal and the transmitted laser beam must share a common aperture. One must conclude, therefore, that aperture sharing devices may well be employed extensively in future space optical systems.

From a system standpoint, aperture sharing must be accomplished in an efficient manner. For applications where neither of the shared functions involves a high-power beam, this requirement can be satisfied by an efficient dichroic beamsplitter. However, in systems which must either transmit or receive a high-power beam, the transparent beamsplitter approach becomes nonviable insofar as there is no efficient means for cooling such a device. Thus, all high-power systems must employ a reflective beam sharing element; either a buried grating or a blind grating. Unfortunately, blind gratings can be used efficiently only when the wavelength of the high-power function is significantly longer than that associated with low-power functions. This constraint sometimes can be met; an example being the use of a visible beacon wavelength in conjunction with the transmission of a near-IR laser beam from ground to space. However, in many instances, the constraint cannot be met. Thus, for the foreseeable future, it must be assumed that many high-power space optical systems will be forced to employ beam sharing elements of the buried grating variety.

The term "forced to use" has been employed deliberately because the present state-of-the-art in cooled buried gratings is not very encouraging; the number of successful gratings produced being few. As will be discussed later, this situation prevails because of fundamental problems associated with the methods employed currently in the production of buried gratings. In light of these circumstances, we have pursued successfully a novel production technique which should lead to superior lower cost buried gratings, and which employs an electroforming process.

The presently employed method for producing prior art buried gratings is a multi-stage process. First, a cooled mirror substrate is coated with a soft metal; usually gold, silver or aluminum. A ruling engine is then used to scribe a grating in the metal surface. Alternately, depending upon the resolution required, the grating may be produced by chemical or ion beam etching. The grating is then "buried," either by vacuum or CVD deposition of a dielectric material upon the ruled surface. The depth of the dielectric is made substantially greater than the depth of the grooves in the grating. Nevertheless, the surface of the dielectric replicates the ruled surface. To flatten the outer surface of the burial layer requires polishing; a process which must be accomplished without breaking through to the grating beneath. A multilayer dichroic coating is then vacuum deposited upon the polished surface. The multilayer dichroic is designed to be highly reflective at the high-power laser wavelength. Other wavelengths, for which the dichroic is transparent, are transmitted through the underlying burial layer and are diffracted at the grating surface. The period and blaze angle of the grating is set such that, upon reflection, the diffracted wavelengths are separated in angle from the reflected laser beam. This allows the different wavelength bands to be spatially separated at some point downstream of the grating. The process is also reversible; i.e., two beams of different wavelengths can initially be separated spatially, and can be combined by means of a grating.

There are many problems associated both with the production and with the operation of buried gratings produced by current techniques. The problems associated with grating production are related primarily to the processing of the burial layer. The problems start at the interface between the ruled metal surface and the vacuum deposited dielectric. Here, it is difficult to obtain reliable adherence, because the grating surface is so fragile that contact cleaning cannot be used. Also, on a microscopic scale, the ruling of a metal surface creates a small burr along the raised edge of each groove. Since vacuum coating is a "straight line" process, somewhat analogous to spray painting, these burrs lead to the inclusion of microscopic voids in the dielectric.

Subsequent removal of the replicated grooves from the outer surface of the dielectric layer employs a polishing process which removes several times the groove depth before the presence of the grooves is eliminated. Thus, to provide some margin for the polishing process, the initial depth of the burial layer must be many times the groove depth. Typical depths fall in the range of 10 to 20 microns. Unfortunately, when a single layer of dielectric is vacuum deposited so as to produce a high-density, low absorption film, the stresses intrinsic to layers of this thickness are so high that structural integrity is far from easy to achieve. Extensive thick-film coating research within the DOF has failed to produce structurally sound dielectric layers on a consistent basis.

Polishing of the outer surface of the dielectric is a high risk process wherein the optician has little or no margin for error. The replicated grating grooves must be polished flat while simultaneously retaining a close tolerance optical figure without streaks, scratches or pits. The penalty for error is costly; the substrate having to be stripped completely and returned to the metal plating and ruling stage.

The physical thickness and the unpredictability in thickness of the burial layer also create problems in the performance of buried gratings; the most serious of which are associated with thermal impedance and the etalon effect. The thermal impedance problem stems from the physical separation of the multi-layer dichroic from the substrate; the dichroic, which handles high-power radiation, being the source of heat which must be removed by the substrate via the burial layer.

The etalon problem is more subtle; stemming from an optical interference effect between the multilayer dichroic and the grating. Basically, the dichroic/burial layer/grating forms a Fabry Perot etalon which exhibits high transmission, or resonance, at any wavelength for which the optical thickness of the burial layer spacer is an integral number of half-waves. The physical thickness of the burial layers produced by polishing typically will fall in the 5 to 15 micron range. Since the refractive indices of suitable dielectrics lie in the range 1.6 to 2.4, the optical thickness of the burial layer can be expected to fall between 8 and 35 microns. For long wavelengths, such as the 3.6 to 4.0 micron band of the Sigma Tau laser, these optical thicknesses produce an etalon for which the number of half-waves can range from 4 to 18. For the 0.351-micron wavelength of a typical excimer laser, the number of half-waves falls in the 40 to 200 range. Because of the magnitude of these numbers, combined with the lack of precision which is intrinsic to the polishing process, it is not possible to tailor the thickness of the burial layer so as to ensure that the actual thickness does not exhibit a resonance with respect to the wavelength of the laser. This is particularly true for chemical lasers, which oscillate simultaneously at many wavelengths.

It should be pointed out that resonant transmission through an etalon occurs even when the reflectivity of the dichroic layer is made very high. (The transmission at resonance of an etalon having mirror reflectivities of 0.999 approaches 100 percent.) Increasing the reflectivity of the dichroic primarily increases the finesse of the etalon; i.e., reduces the width of the transmission bands. Thus, while high reflectivity on the part of the dichroic decreases the probability for resonance, it is relatively ineffective in reducing the power transmitted to the substrate when a resonant condition exists. Perhaps the most unfortunate, but not unlikely condition, is the one wherein a slight wedge exits within the burial layer. Here, the etalon will exhibit resonant transmission of power to the substrate within a set of narrow stripes which lie at right angles to the wedge.

Recent conceptual work has examined the introduction of an absorbing layer between the dichroic and the grating. Despite the added complexity, such a layer could reduce the resonant transmission of the etalon; essentially decoupling the two reflectors. However, the absorbing layer must not absorb at the wavelengths being reflected by the grating. Also, in the presence of pinholes or scratches in the dichroic, the introduction of absorption between the dichroic and the grating might prove more of a hazard than a blessing.

The electroforming process is an electroplating process wherein metal is plated upon a mandrel to a depth such that subsequent separation of the plating from the mandrel produces a free-standing part. Initiation of a development program was prompted by the development of a proprietary electroforming process whereby the internal stresses of electroformed parts can be maintained at a very low level. This, in turn, eliminated the distortion which normally accompanies the removal of a part from an electroforming mandrel. By using single point diamond turning to produce superprecision mandrels, it then became possible to produce electroformed components to optical tolerances.

This development activity has produced several significant advances in the state-of-the-art. The accuracy of optical surfaces has been improved to the point where fractional wavelength tolerances at visible wavelengths can be achieved on surfaces up to about 20 centimeters in diameter. The low stress process, which originally was limited to copper and nickel, has been modified so as to accommodate a low-expansion nickel-/iron alloy. A pulse plating process has been refined such that stiffening structures can be attached to thin electroformed mirror face-plates prior to removal from the mandrel.

In parallel with advances in electroformed mirror structures, there have been complementary advances in the coatings which must be applied to the optical surfaces of such structures. Here, the primary emphasis has been placed on the development of thin-film coatings which can be applied to a mandrel and which, subsequently, are transferred to the mirror at the time of separation from the mandrel. The advantages of this approach over conventional methods of applying coatings to finished optics are several. First, after a coating has been vacuum deposited on a mandrel, it can be tested for structure. Second, it is easier to achieve high-vacuum compatibility for a mandrel than for a complex cooled mirror structure. However, perhaps the most important advantage is that associated with thin-film coatings which only can be applied in a sequence which is reversed from that of a normal deposition practice. The foremost example of an optical device, which can be vacuum deposited only by a reverse sequence process, is that of the buried grating.

BRIEF SUMMARY OF THE INVENTION

In accordance with a preferred embodiment of the invention, a two-metal grating is produced by vacuum depositing a first dielectric coating upon a separation layer formed upon a mandrel; then depositing a first optically opaque metallic layer, etching the layer to form stripes; then vacuum depositing a second optically opaque film; then electroforming a backing structure and separating the dielectric coating from the separation layer on the mandrel to form a free-standing grating structure having a smooth surface to provide the aforesaid benefits. This structure can then be affixed to a metallic mirror. A buried phase grating can also be fabricated by additionally depositing a second dielectric layer and a third metallic layer in a manner to be described.

BRIEF DESCRIPTION OF THE DRAWINGS

Other objects, features and advantages of the invention will become apparent upon study of the following description, taken in conjunction with the drawings in which.

DETAILED DESCRIPTION OF PREFERRED EMBODIMENTS OF THE INVENTION

Figure 1:
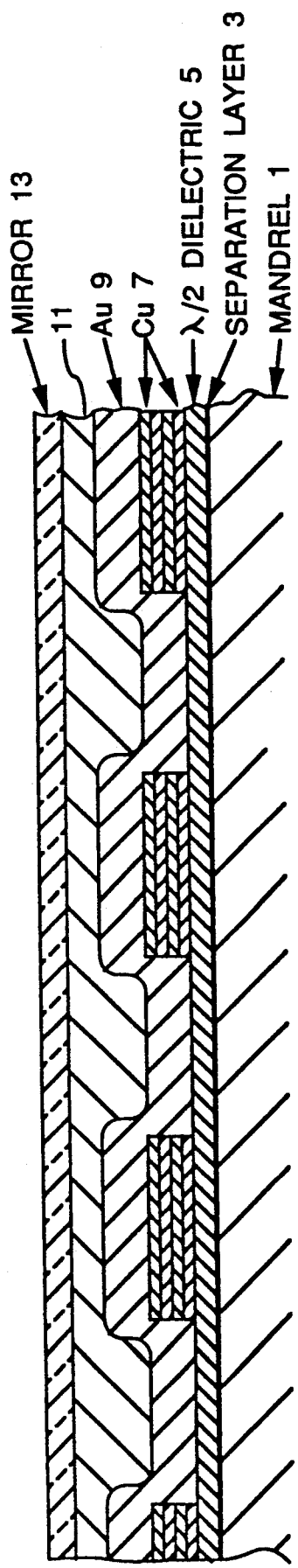
FIG. 1 illustrates a two-metal grating made by the method of the invention.

One embodiment of an electroformed buried grating is that shown in cross-section in FIG. 1. To produce such a grating, a precision stainless steel mandrel 1 is first provided with a thin separation, or passivation layer 3, which defines the interface at which separation will occur. This is followed by the vacuum deposition of a thin dielectric coating 5, ideally having an optical thickness of one half-wave at the wavelength for which the grating has its highest efficiency. After separation from layer 3, this dielectric layer 5 provides physical protection for the soft metal surface of the grating. The dielectric layer is followed by an optically opaque, vacuum deposited metal layer 7, such as gold, silver or copper. A photoresist film is then applied to the fresh metal surface. Since the photoresist coating must be uniformly thin, this step is usually performed on a heavy-duty spin table. The photoresist is then exposed to the desired grating pattern. After the exposed photoresist has been processed, the unprotected regions of the underlying metal film are chemically etched to expose the separation layer. The remaining photoresist is then removed. For a structure such as that shown in FIG. 1, this leaves the mandrel with an intact separation layer 3 upon which is superimposed a set of narrow copper grating stripes 7.

The mandrel is then returned to the vacuum chamber and coated with an optically opaque film 9 of a second metal, the metal used in the example being gold. A backing structure 11 is then electroformed directly upon the coated mandrel. The grating structure, upon separation from the mandrel, consists of alternating stripes of the two metals as shown, which is thereafter affixed to mirror 13 via backing structure 11. It should be noted that the surface of an electroformed two-metal grating is smooth and that the grating effect is created by the differences between the refractive indices and extinction coefficients of the two metals. This is in contrast to conventional gratings, where the grating effect is created by the introduction of physical grooves in the surface.

The mechanically smooth surface of the electroformed grating has three major advantages over its conventional counterpart. First and foremost, it allows the direct addition of a multilayer dichroic; thereby eliminating the need for a burial layer with its attendant problems. Second, its optically smooth surface exhibits far less chatter than does the mechanically imperfect surface of a conventional grating. Third, the freshly exposed surface of an electroformed grating is intrinsically clean; thereby facilitating good adherence to the subsequently deposited dichroic. Also, if a contaminant should be present, its smooth dielectrically protected surface can be cleaned with relative ease.

Figure 2:
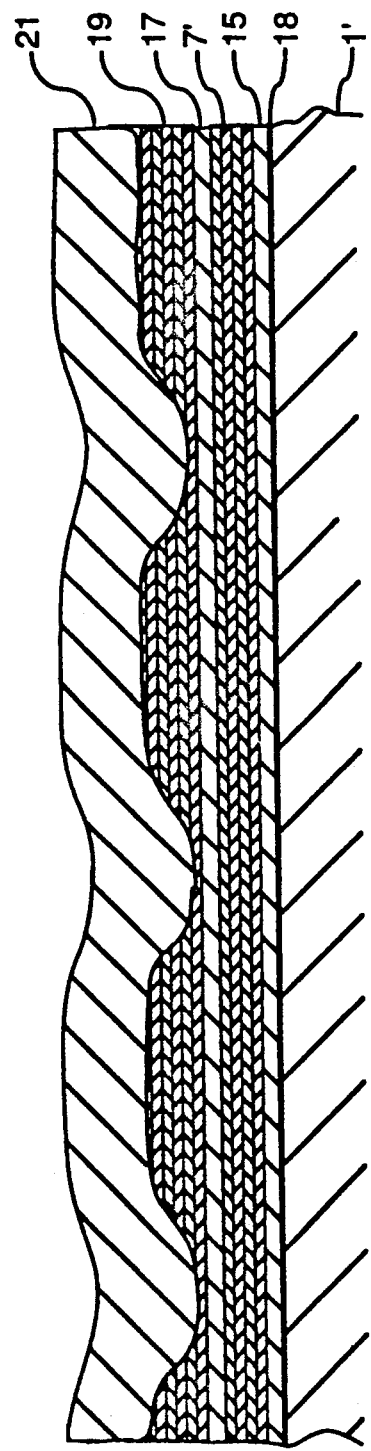
FIG. 2 illustrates a buried phase grating made in accordance with the method of the invention.

The electroformed phase grating structure shown in FIG. 2 is more sophisticated than the simple two-metal grating. Here, the first dielectric layer 15 on the separation layer 18 of mandrel 1' has an optical thickness of a quarter-wave, rather than the half-wave used for the two-metal grating. Also, the chemical etch sequence for the phase grating including forming Cu stripes 7', is followed by the vacuum deposition of a second quarter-wave thick layer of dielectric 17 and a second opaque layer of Cu metal 19. For a phase grating design, the metal used for the second layer is the same as that used for the stripes. This provides identical phase shifts at all dielectric/metal interfaces; the desired 180-degree phase shift between adjacent stripes of the grating being determined solely by the optical thickness of the second dielectric layer.

In the example shown in FIG. 2, the second copper layer 19 is covered by a gold layer 21 which serves both to protect the copper from the electroforming bath and to provide good adhesion between the grating and the underlying structure. Other metals such as nickel have also been used successfully as protective layers.

Although the electroform process provides a smooth grating surface upon which a multilayer dichroic can subsequently be deposited in a straightforward manner, a more optimum technique probably involves the deposition of the entire dichroic/grating stack upon the mandrel. Previous experimental work has progressed to the point where the multilayer dichroic stack and the phase grating structure have separately been transferred successfully from mandrel to finished mirror 13.

While preferred embodiments of the present invention have been described, numerous variations will be apparent to the skilled worker in the art, and thus the scope of the invention is to be restricted only by the terms of the following claims and art recognized equivalents thereof.

What is claimed is:
1. Method of producing a buried two-metal grating having a smooth surface comprising the steps of:
 (a) providing an electroforming mandrel having a separation layer affixed thereto;
 (b) vacuum depositing a dielectric coating having an optical thickness of one half-wave at the wavelength for which the buried grating has its highest efficiency over the separation layer;
 (c) thereafter vacuum depositing an optically opaque metallic layer selected from the group consisting of gold, silver and copper, upon said dielectric coating;
 (d) thereafter forming a grating member by etching away stripes of the opaque metallic mirror layer;
 (e) thereafter vacuum depositing an additional optically opaque film upon said grating member formed in accordance with step (d);
 (f) thereafter electroforming a backing structure upon the additional optically opaque film present upon said mandrel;
 (g) thereafter separating said dielectric coating deposited upon said mandrel in accordance with step (b) from said separation layer affixed to said mandrel, to form a free-standing grating structure having a smooth surface.

2. The method of claim 1 further including the step of thereafter affixing the backing structure to a mirror, thereby to mount the grating structure produced in accordance with step (g) upon the mirror.

3. The method of claim 2 wherein the optically opaque film deposited in accordance with step (e) is gold.

4. The method of claim 1 wherein the optically opaque film deposited in accordance with step (e) is gold.

5. Method of producing a buried phase grating having a smooth surface comprising the steps of:
 (a) providing an electroforming mandrel having a separation layer affixed thereto;
 (b) vacuum depositing a first dielectric coating having an optical thickness of one quarter-wave at the wavelength for which the buried grating has its highest efficiency over the separation layer;
 (c) thereafter vacuum depositing a first optically opaque metallic layer selected from the group consisting of gold, silver and copper, upon said first dielectric coating;

(d) thereafter forming a grating member by etching away stripes of the first opaque metallic layer to expose said separation layer;
(e) thereafter depositing a second dielectric coating having an optical thickness of one quarter-wave over the grating member produced in accordance with step (d);
(f) thereafter depositing a second optically opaque metallic layer of the same metal deposited in accordance with step (c) over the second dielectric coating;
(g) thereafter vacuum depositing a third metallic layer to protect the second metallic layer from an electroforming bath;
(h) utilizing the electroforming bath for electroforming a backing structure upon the third metallic layer; and
(i) thereafter separating said first dielectric coating deposited upon said mandrel in accordance with step (b) from said separation layer affixed to said mandrel, to form a free-standing grating structure having a smooth surface.

6. The method of claim 5 further including the step of thereafter affixing the backing structure to a mirror, thereby to mount the free-standing grating structure produced in accordance with step (i) upon the mirror.

7. The method of claim 6 wherein the third metallic layer is gold.

8. The method of claim 5 wherein the third metallic layer is gold.

9. Method of producing a buried two-metal grating having a smooth surface comprising the steps of:
(a) providing a mandrel having a separation layer affixed thereto;
(b) depositing a dielectric coating having an optical thickness of one half-wave at the wavelength for which the buried grating has its highest efficiency over the separation layer;
(c) thereafter depositing an optically opaque metallic layer upon said dielectric coating;
(d) thereafter forming a grating member by etching away stripes of the opaque metallic layer;
(e) thereafter depositing an additional optically opaque film upon said grating member formed in accordance with step (d);
(f) thereafter forming a backing structure upon the additional optically opaque film present upon said mandrel;
(g) thereafter separating said dielectric coating deposited upon said mandrel in accordance with step (b) from said separation layer affixed to said mandrel, to form a free-standing grating structure having a smooth surface.

10. The method of claim 9 further including the step of thereafter affixing the backing structure to a mirror, thereby to mount the grating structure produced in accordance with step (g) upon the mirror.

11. The method of claim 10 wherein the optically opaque film deposited in accordance with step (e) is gold.

12. The method of claim 9 wherein the optically opaque film deposited in accordance with step (e) is gold.

13. The method of claim 9 wherein the optically opaque layer deposited in accordance with step (c) is selected from the group consisting of copper, silver and gold.

14. The method of claim 9 wherein steps (b), (c) and (e) are carried out by vacuum deposition.

15. Method of producing a buried phase grating having a smooth surface comprising the steps of:
(a) providing a mandrel having a separation layer affixed thereto;
(b) depositing a first dielectric coating having an optical thickness of one quarter-wave at the wavelength for which the buried grating has its highest efficiency over the separation layer;
(c) thereafter depositing a first optically opaque metallic layer upon said first dielectric coating;
(d) thereafter forming a grating member by etching away stripes of the first opaque metallic layer;
(e) thereafter depositing a second dielectric coating having an optical thickness of one quarter-wave over the grating member produced in accordance with step (d);
(f) thereafter depositing a second optically opaque metallic layer of the same metal deposited in accordance with step (c) over the second dielectric coating;
(g) thereafter depositing a third metallic layer to protect the second metallic layer from an electroforming bath;
(h) forming a backing structure upon the third metallic layer; and
(i) thereafter separating said first dielectric coating deposited upon said mandrel in accordance with step (b) from said separation layer affixed to said mandrel, to form a free-standing grating structure having a smooth surface.

16. The method of claim 15 further including the step of thereafter affixing the backing structure to a mirror, thereby to mount the free-standing grating structure produced in accordance with step (i) upon the mirror.

17. The method of claim 15 wherein the third metallic layer is gold.

18. The method of claim 16 wherein the third metallic layer is gold.

19. The method of claim 15 wherein the optically opaque layer deposited in accordance with step (c) is selected from the group consisting of copper, silver and gold.

20. The method of claim 15, wherein steps (b), (c), (e) and (f) are carried out by vacuum deposition.

* * * * *